(12) United States Patent
Hachisuga et al.

(10) Patent No.: US 9,288,351 B2
(45) Date of Patent: Mar. 15, 2016

(54) IMAGE READING APPARATUS

(71) Applicant: FUJI XEROX CO., LTD., Tokyo (JP)

(72) Inventors: Masaki Hachisuga, Kanagawa (JP); Michio Kikuchi, Kanagawa (JP); Kiyofumi Aikawa, Kanagawa (JP); Hideki Moriya, Kanagawa (JP); Takashi Hiramatsu, Kanagawa (JP); Kazuya Fukunaga, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 14/609,728

(22) Filed: Jan. 30, 2015

(65) Prior Publication Data
US 2016/0021268 A1    Jan. 21, 2016

(30) Foreign Application Priority Data

Jul. 16, 2014 (JP) ................................. 2014-145883

(51) Int. Cl.
H04N 1/04 (2006.01)
H04N 1/40 (2006.01)
H04N 1/00 (2006.01)

(52) U.S. Cl.
CPC ................................ *H04N 1/00615* (2013.01)

(58) Field of Classification Search
CPC .................................................. H04N 1/00615
USPC ......... 358/461, 406, 474, 486, 496, 498, 504, 358/505
See application file for complete search history.

(56) References Cited

U.S. PATENT DOCUMENTS

| | | | | |
|---|---|---|---|---|
| 5,101,284 | A * | 3/1992 | Tanabe | 358/461 |
| 6,891,648 | B2 * | 5/2005 | Inoue et al. | 358/516 |
| 6,947,187 | B2 * | 9/2005 | Mui et al. | H04N 1/00909 358/461 |
| 6,989,915 | B2 * | 1/2006 | Honjo et al. | 358/461 |
| 7,411,704 | B2 * | 8/2008 | Wang | 358/461 |
| 7,692,818 | B2 * | 4/2010 | Futami | 358/3.26 |
| 8,054,511 | B2 * | 11/2011 | Aoki et al. | 358/461 |
| 8,503,039 | B2 * | 8/2013 | Nishikawa | 358/461 |
| 8,553,295 | B2 * | 10/2013 | Nishida et al. | 358/461 |
| 8,922,854 | B2 * | 12/2014 | Hyoki | 358/518 |
| 2007/0223062 | A1 * | 9/2007 | Tanaka | H04N 1/03 358/497 |
| 2009/0304425 | A1 * | 12/2009 | Aoki et al. | 399/367 |
| 2010/0290093 | A1 * | 11/2010 | Ito | 358/461 |
| 2012/0020713 | A1 * | 1/2012 | Ishii | G03G 15/5062 399/388 |
| 2012/0097872 | A1 * | 4/2012 | Ito et al. | 250/559.4 |

(Continued)

FOREIGN PATENT DOCUMENTS

JP    2001-313794 A    11/2001
JP    2002-051194 A    2/2002
JP    2010-114498 A    5/2010

*Primary Examiner* — Cheukfan Lee
(74) *Attorney, Agent, or Firm* — Sughrue Mion, PLLC

(57) ABSTRACT

Provided is an image reading apparatus including a guide plate that is movable between a first position and a second position and guides a medium at one side thereof when disposed at the first position, a retention member that is rotatable about an axis intersecting a direction in which the medium is guided, that has a first side surface and a second side surface which has a curvature greater than a curvature of the first side surface, and that retains plural color samples on the second side surface, a reading unit that reads, at a reading position, an image formed on the medium guided by the guide plate, and a rotating unit that causes the retention member to rotate such that the other side of the guide plate and the first side surface face each other and the plural color samples are moved to the reading position.

20 Claims, 5 Drawing Sheets

(56) References Cited

U.S. PATENT DOCUMENTS

| | | | |
|---|---|---|---|
| 2012/0099110 A1* | 4/2012 | Ito et al. | 356/445 |
| 2012/0099126 A1* | 4/2012 | Yokota et al. | 358/1.13 |
| 2012/0099168 A1* | 4/2012 | Ninomiya et al. | 358/498 |
| 2012/0099873 A1* | 4/2012 | Ninomiya et al. | 399/15 |
| 2012/0099874 A1* | 4/2012 | Nakaie et al. | 399/16 |
| 2012/0099884 A1* | 4/2012 | Nakaie et al. | 399/74 |
| 2012/0106987 A1* | 5/2012 | Furusawa et al. | 399/15 |
| 2013/0258420 A1* | 10/2013 | Nakaie et al. | 358/474 |
| 2014/0168729 A1* | 6/2014 | Ikeda | H04N 1/00655 358/498 |

\* cited by examiner

IMAGE READING APPARATUS

CROSS-REFERENCE TO RELATED APPLICATIONS

This application is based on and claims priority under 35 USC 119 from Japanese Patent Application No. 2014-145883 filed Jul. 16, 2014.

BACKGROUND

Technical Field

The present invention relates to an image reading apparatus.

SUMMARY

According to an aspect of the invention, there is provided an image reading apparatus including:

a guide plate that is movable between a first position and a second position and guides a medium at one side thereof when disposed at the first position;

a retention member that is rotatable about an axis intersecting a direction in which the medium is guided, that has a first side surface and a second side surface which has a curvature greater than a curvature of the first side surface, and that retains plural color samples on the second side surface;

a reading unit that reads, at a reading position, an image formed on the medium guided by the guide plate; and a rotating unit that causes the retention member to rotate such that the other side of the guide plate and the first side surface face each other when the guide plate is disposed at the first position and the plural color samples are moved to the reading position when the guide plate is disposed at the second position.

BRIEF DESCRIPTION OF THE DRAWINGS

Exemplary embodiments of the present invention will be described in detail based on the following figures, wherein.

DETAILED DESCRIPTION

1. Exemplary Embodiment

Figure 1:
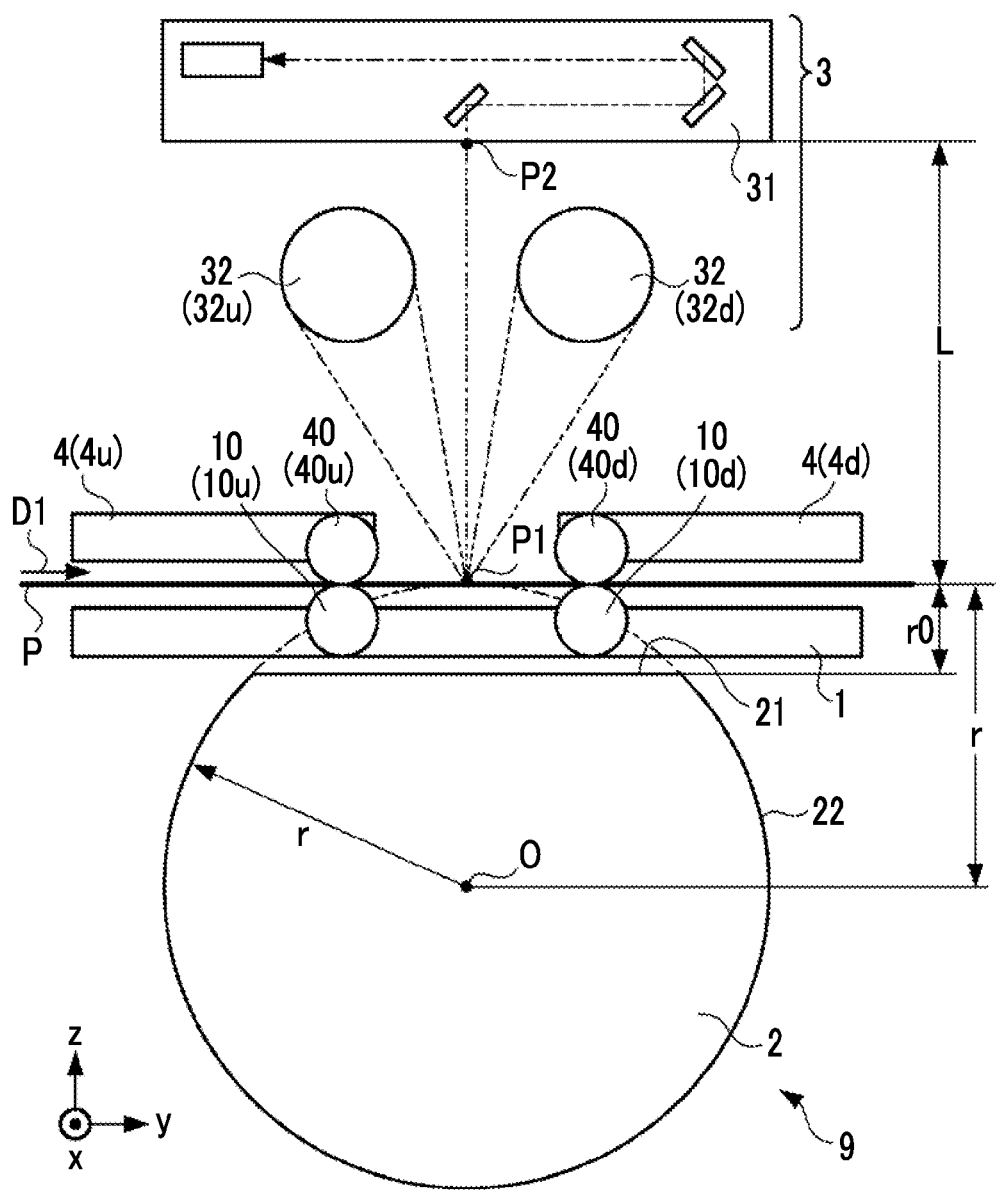
FIG. 1 is a view illustrating a major configuration of an image reading apparatus according to an exemplary embodiment of the invention.

1-1. Entire Configuration of Image Reading Apparatus

Hereinafter, an image reading apparatus 9 according to the exemplary embodiment of the invention will be described. In the drawings, a space where members of the image reading apparatus 9 are disposed is represented as an xyz right-handed coordinate space. Among coordinate symbols shown in the drawings, a symbol with a point inside a circle represents an arrow pointing toward the front side from the back side of a paper surface. A direction along an x axis in the space is referred to as an x-axial direction. In addition, in the x-axial direction, a direction in which a value of an x component increases is referred to as a +x direction and a direction in which a value of the x component decreases is referred to as a −x direction. Similarly, with respect to the y and z components, in accordance with the above definition, a y-axial direction, a +y direction, a −y direction, a Z-axial direction, a +z direction, and a −z direction are defined.

FIG. 1 is a view illustrating a major configuration of the image reading apparatus 9 according to the exemplary embodiment of the invention. A guide plate 1 is a member that guides a medium such as a sheet P. The guide plate 1 is disposed parallel to an xy plane and guides the sheet P, which is transported in a transport direction D1 corresponding to the +y direction by the surface in the +z direction side, to a reading position P1 where a reading section 3 reads an image. The guide plate 1 is capable of moving along the y-axial direction and guides the sheet P when the guide plate is disposed at a position (hereinafter, referred to as a first position) illustrated in FIG. 1.

A retention member 2 has a shape of a side surface obtained when a solid cylinder having a radius r with an axis O as the center is cut along a direction of the axis O so as not to be in contact with the guide plate 1 disposed at the first position. The axis O is provided in a direction intersecting with a direction (+y direction) in which the sheet P is guided and is provided along the X-axial direction in FIG. 1. Of the side surfaces of the retention member 2, a portion with a flat surface which seems to be formed by cutting the solid cylinder described above is called a first side surface 21 and a portion except for the first side surface 21 is called a second side surface 22.

When the guide plate 1 is disposed at the first position, the retention member 2 illustrated in FIG. 1 maintains a posture in which the first side surface 21 faces the +z direction. The retention member 2 has a space having a width of a distance r0 (<r) from the reading position P1 in the −z direction due to this posture. Therefore, even when the guide plate 1 moves through the space, a collision with the retention member 2 does not occur.

Plural types of color samples are retained on the second side surface 22. The second side surface 22 has an area greater than the first side surface 21. The color sample corresponds to a sample called a calibration patch or the like and a single color sample displays one color (true color) as a reference of color calibration. The plural types of color samples are arranged on the second side surface 22 so as to be retained at predetermined positions. The plural types of arranged color samples are referred to as a so-called color chart and are used for the calibration of a color read by the reading section 3.

A storage unit of a control section 7 (refer to FIG. 2) not illustrated in FIG. 1 stores an corresponding table obtained by associating a value of a true color which is displayed by the retained color sample with a position of the color sample on the second side surface 22. When the reading section 3 reads the color sample, the control section 7 specifies the position of the color sample based on a rotation angle or the like of the retention member 2, refers to the corresponding table, and thereby compares the value of the true color stored in advance from the color sample read by the reading section 3 and a value of a color that is actually read. The control section 7 determines a parameter or the like which is used in a mathematical expression (compensation expression) or a compensation expression thereof such that a value of a read color is corrected to become closer to the value of the true color.

In the description described above, the retention member 2 has a shape of a side surface obtained when a solid cylinder having a radius r with an axis O as the center is cut along a direction of the axis O; however, the formation of the shape is not limited to a shape that is formed by actually cutting the solid cylinder. For example, the retention member 2 may be formed through injection molding of a resin or the like into a mold in accordance with the shape described above. In addition, the first side surface 21 does not have to be completely flat, but may be flat to the extent that the guide plate 1 and the first side surface 21 may face to each other. The second side surface 22 does not have to be completely circular, either, but may have curvature greater than the first side surface 21 and may have a curved surface (for example, side surface of elliptic cylinder or the like) such that the second side surface 22 may rotate about the axis O. In terms of decreasing the displacement of the reading position P1 of an imaging unit 31 to be described later, it is desirable that the second side surface 22 become a side surface of a circle with a rotation axis as the center.

In addition, the retention member 2 may have a hollow on a side close to the axis O from the first side surface 21. That is, the side surface of the retention member 2 may have, for example, a shape obtained when a cylinder having a radius r from the axis O to the outer circumferential surface thereof is cut along a direction of the axis O.

In addition, in the case where the retention member 2 has a hollow, the shape before being cut is not limited to the cylinder and, for example, may have a hollow having a shape along the first side surface 21 and the second side surface 22 of the retention member 2. In short, the shape of the retention member 2 before being cut may have a curved outer circumference when the retention member 2 is cut to form a plane perpendicularly intersecting with the axis O.

The reading section 3 has the imaging unit 31 and lighting 32. The lighting 32 includes lighting 32u that emits light from the upstream side (−y direction) in the transport direction of the sheet P and lighting 32d that emits light from the downstream side (+y direction) in the transport direction of the sheet P (hereinafter, in a case where the two devices of lighting are not distinguished, is simply referred to as "lighting 32"). The reading position P1 is irradiated with the two items of lighting 32 and, thereby an image with smaller variability or deviation is read, compared to a case where the image is irradiated from a single direction.

The reading position P1 is positioned separated by a distance corresponding to the radius r from the axis O in the +z direction. Accordingly, in a state in which the guide plate 1 is separated from the first position and is moved to a position so as not to overlap a portion within the radius r from the axis O, the second side surface 22 corresponding to the side surface spaced from the axis O by radius r moves to the reading position P1 when the retention member 2 rotates about the axis O.

The imaging unit 31 receives reflected light from the reading position P1 at a light-receiving point P2, directs the reflected light to an image pickup device through an optical system such as a prism or mirror reflector which is disposed inside and, thereby, reads an image formed on the sheet P. The length of a path of the reflected light received at the light-receiving point P2 to reaching the image pickup device through the inside is adjusted in advance. The reading position P1 and the light-receiving point P2 are disposed so as to be spaced by a predetermined distance L in the z-axial direction. Accordingly, the distance of the path of the light reflected from the reading position P1 to reaching the image pickup device of the imaging unit 31 is adjusted so as to be constant.

In order to cause the light reflected from the reading position P1 to be unlikely to interfere with light reflected from other portions, a shield 4 is included which is a plate that shields a medium such as the sheet P from receiving the lighting 32. The shield 4 includes a shield 4u that blocks the light that irradiates the upstream side (−y direction) of the transport direction of the sheet P and a shield 4d that blocks the light which is emitted to the downstream side (+y direction) of the transport direction of the sheet P (hereinafter, in a case where the two shields are not distinguished, is simply referred to as "shield 4"), of a surface of the sheet P on which an image is formed.

The shield 4 has a function of restricting a movement range of the medium such that the medium is not excessively close to the reading section 3, in addition to a function of blocking a part of light arriving from the lighting 32. Since the sheet P corresponding to the medium is interposed between the shield 4 and the guide plate 1, the sheet P is more stably positioned in the z-axial direction compared to the case where there is no shield 4. In the image reading apparatus 9, a restriction member may be disposed, which, principally, has a function of restricting the movement range of the medium, instead of the shield 4.

Figure 2:
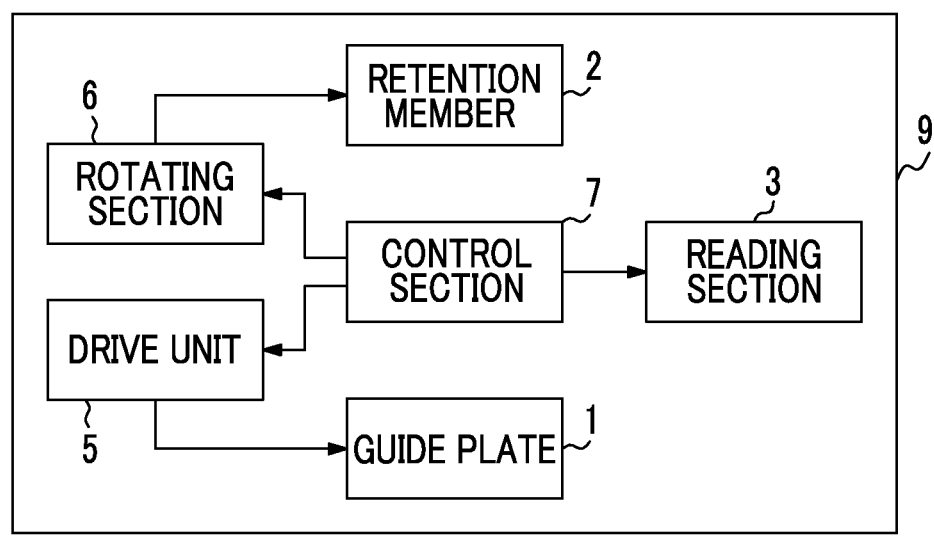
FIG. 2 is a block diagram illustrating a control system of the image reading apparatus.

FIG. 2 is a block diagram illustrating a control system of the image reading apparatus 9. A drive unit 5 includes a power transmission mechanism that converts a rotational motion of a power source such as a motor and a power source such as a rack-and-pinion into a linear motion and is driven under the control of the control section 7 so as to cause the guide plate 1 to move along the y-axial direction. A rotating section 6 includes a power source such as a motor or a power transmission mechanism such as a gear and causes the retention member 2 to rotate about the axis O under the control of the control section 7.

The control section 7 is a unit for controlling the operations of components of the image reading apparatus 9. The control section 7 includes an arithmetic processing device such as a central processing unit (CPU), a storage device such as a read only memory (ROM) or a random access memory (RAM) and executes a program stored in a storage device. The control section 7 controls the drive unit 5 so as to move the guide plate 1 along the y-axial direction and controls the rotating section 6 so as to rotate the retention member 2 about the axis O.

A member for transporting the sheet P may be provided on the guide plate 1 and the shield 4. For example, as illustrated in FIG. 1, transport rollers 10u and 10d (hereinafter, in a case where the two rollers are not distinguished, are simply referred to as "transport rollers 10") which have an axis along the x-axial direction are provided on the guide plate 1. In addition, transport rollers 40u and 40d (hereinafter, in a case where the two rollers are not distinguished, are simply referred to as "transport rollers 40") which have an axis along the x-axial direction may be provided on the shield 4.

In FIG. 1, the transport roller 10u and the transport roller 40u are provided on the upstream side (−y direction) from the reading position P1 in the transport direction of the sheet P and the transport roller 10d and the transport roller 40d are provided on the downstream side (+y direction) from the reading position P1 in the transport direction of the sheet P. At least a part of the transport rollers 10 faces the first side surface 21 of the retention member 2 when the guide plate 1 is disposed at the first position.

The transport rollers 10 and the transport rollers 40 are disposed at positions so as to face each other such that the sheet P is interposed therebetween. Any one of the transport rollers 10 and the transport rollers 40 is connected to a motor or the like and rotates by receiving power of the motor such that the interposed sheet P is transported in the transport direction D1. The sheet P transported in the transport direction D1 reaches the reading position P1. That is, the transport rollers 10 are an example of a transport member that transports the medium to the reading position. The presence of the transport rollers 10 causes the sheet P on the guide plate 1 to be more easily transported to the reading position P1, compared to the case where there is no transport roller 10.

Figure 3A:
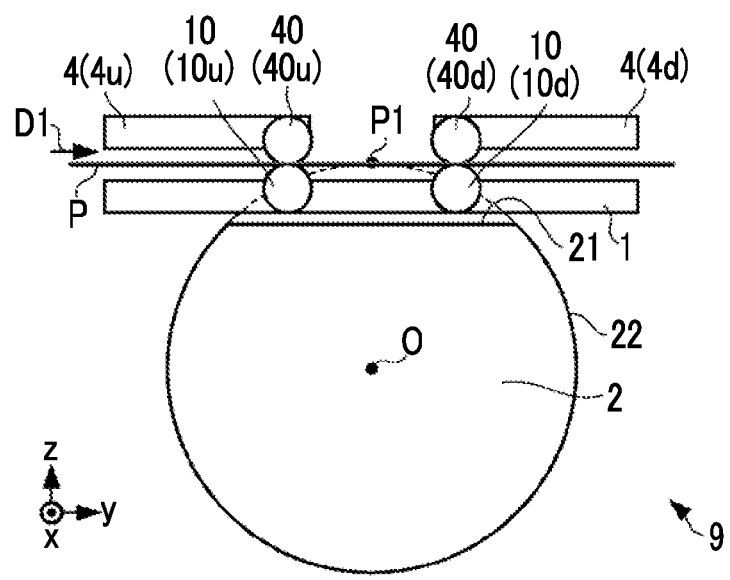
FIGS. 3A and 3B are views illustrating movement of a guide plate.
Figure 3B:
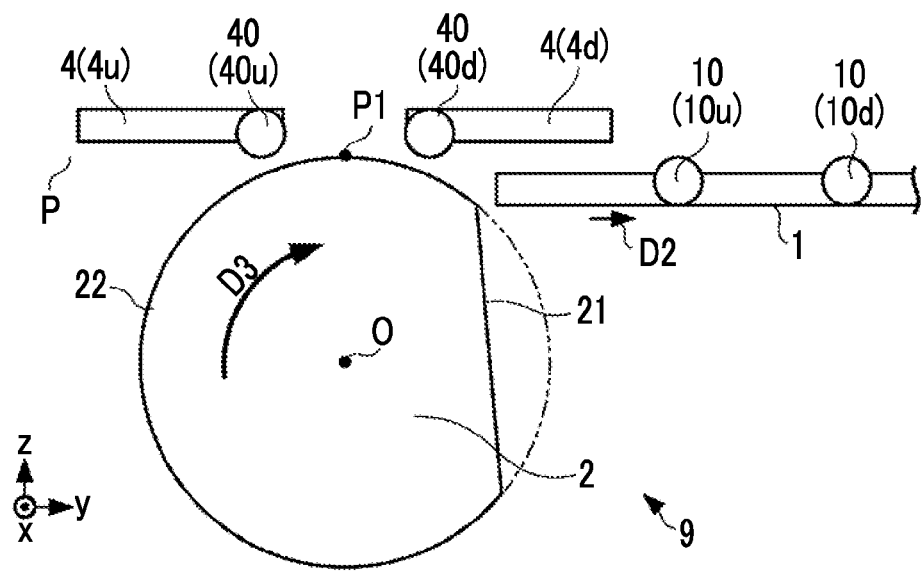

FIGS. 3A and 3B are views illustrating the movement of the guide plate 1. The guide plate 1 is capable of moving to a position (hereinafter, referred to as a second position) illustrated in FIG. 3B, in addition to the first position illustrated in FIG. 3A. The guide plate 1 disposed at the first position moves along a movement direction D2 (+y direction) illustrated in FIG. 3B and reaches the second position. In the image reading apparatus 9, the drive unit 5 causes the guide plate 1 to move to the first position when the reading section 3 reads the image formed on the sheet P such that the guide plate 1 guides the sheet P.

Meanwhile, in the image reading apparatus 9, the drive unit 5 causes the guide plate 1 to move to the second position when the reading section 3 is caused to read the color samples retained on the second side surface 22 of the retention member 2. The second position is a position spaced from the axis O by the length of the radius r or more. That is, the second position is spaced from the axis O such that the guide plate 1 does not come into contact with the retention member 2 even when the retention member 2 rotates about the axis O. When the guide plate 1 is disposed at the second position, the rotating section 6 causes the retention member 2 to rotate in a rotating direction D3. The rotation causes the color sample retained on the second side surface 22 of the retention member 2 to move to the reading position P1. The reading section 3 reads the color sample reached at the reading position P1 and performs correction of the color. The rotating direction D3 in FIG. 3B is a clockwise direction with the axis O as the center.

In the configuration described above of the image reading apparatus 9, without a collision between the guide plate 1 that guides the sheet P (medium) and the retention member 2 that retains a color sample, the reading section 3 reads, at a reading position, both an image formed on the sheet P and the color sample retained on the second side surface 22 of the retention member 2. The image reading apparatus 9 reads the plural types of color samples retained on the second side surface 22 that has an area greater than the first side surface 21 and determines a compensation expression by which a pixel value obtained by reading the image formed on the sheet P is corrected. Therefore, the image reading apparatus 9 may include many types of color samples to be read, unlike in a case where, without rotating the retention member 2, the color sample retained on the retention member 2 is read and the compensation expression is determined. Thus, it is possible to improve the accuracy of the color calibration.

In addition, the guide plate 1 moves to the second position along with the transport rollers 10 when the color sample retained on the second side surface 22 of the retention member 2 moves to the reading position P1. In this way, unlike the image reading apparatus having the configuration in which the transport roller does not move, the transport rollers 10 do not collide with the color sample when the reading section 3 reads the color sample.

When the guide plate 1 is disposed at the first position, at least a part of the transport rollers 10 faces the first side surface 21 of the retention member 2. Thus, the retention member 2 is disposed on the inner side of the space where there is a possibility that the rotation of the retention member 2 causes the movement thereof. Therefore, unlike in the case where the transport rollers 10 are disposed (not facing the first side surface 21) on the outside of the space, in the image reading apparatus 9, the interval between the transport rollers 10 arranged in the transport direction may be decreased, and it is possible to shorten the lower limit of the length of the transportable medium in the transport direction.

2. Modification Example

The description according to the exemplary embodiment is as above; however, the details of the exemplary embodiment may be modified as follows. In addition, the following modification examples may be combined with each other.

2-1. Modification Example 1

In the exemplary embodiment described above, the transport rollers 10 are provided on the guide plate 1 and the transport rollers 40 are provided on the shield 4, but these transport rollers may not be provided. Instead, a member that guides a medium by being in contact with a convex portion or the like of the medium may be provided 2-2. Modification Example 2

In the exemplary embodiment described above, the transport rollers 10 provided on the guide plate 1 face the first side surface 21 of the retention member 2 when the guide plate 1 is disposed at the first position, but the transport rollers 10 may not face the first side surface 21.

2-3. Modification Example 3

The rotating section 6 may be controlled by the control section 7 such that the retention member 2 does not rotate when the guide plate 1 is present in a space where the rotation of the retention member 2 brings about a collision with the guide plate 1. For example, the control section 7 detects the position of the guide plate 1 with an optical sensor or the like and determines whether or not the guide plate 1 is present in the space where rotation of the retention member 2 causes a collision with the guide plate 1. In a case where the guide plate 1 is determined to be present in the space, the rotation of the retention member 2 by the rotating section 6 may be forcibly stopped. In this way, when at least a part of the guide plate 1 remains in the space from the axis O with the radius r due to some failure, for example, the collision with the guide plate 1 due to the rotation of the retention member 2 is avoided.

When the control section 7 determines whether or not the guide plate 1 is present in the space where the rotation of the retention member 2 brings about a collision with the guide plate 1, the control section 7 stores a movement state of the guide plate 1, and may stop the rotation of the retention member 2 using the rotating section 6 in a case where it is determined that the guide plate 1 is present in the space.

In addition, the guide plate 1 may have, in advance, a pattern or a characteristic color which may be read by the reading section 3 in a case where the guide plate 1 is present in the space where the rotation of the retention member 2 brings about a collision with the guide plate 1, and the reading section 3 reads the pattern or the characteristic color. Then, it is determined that the guide plate 1 is present in the space where the rotation of the retention member 2 brings about a collision with the guide plate 1 and the rotation of the retention member 2 by the rotating section 6 may be stopped.

2-4. Modification Example 4

Figure 4:
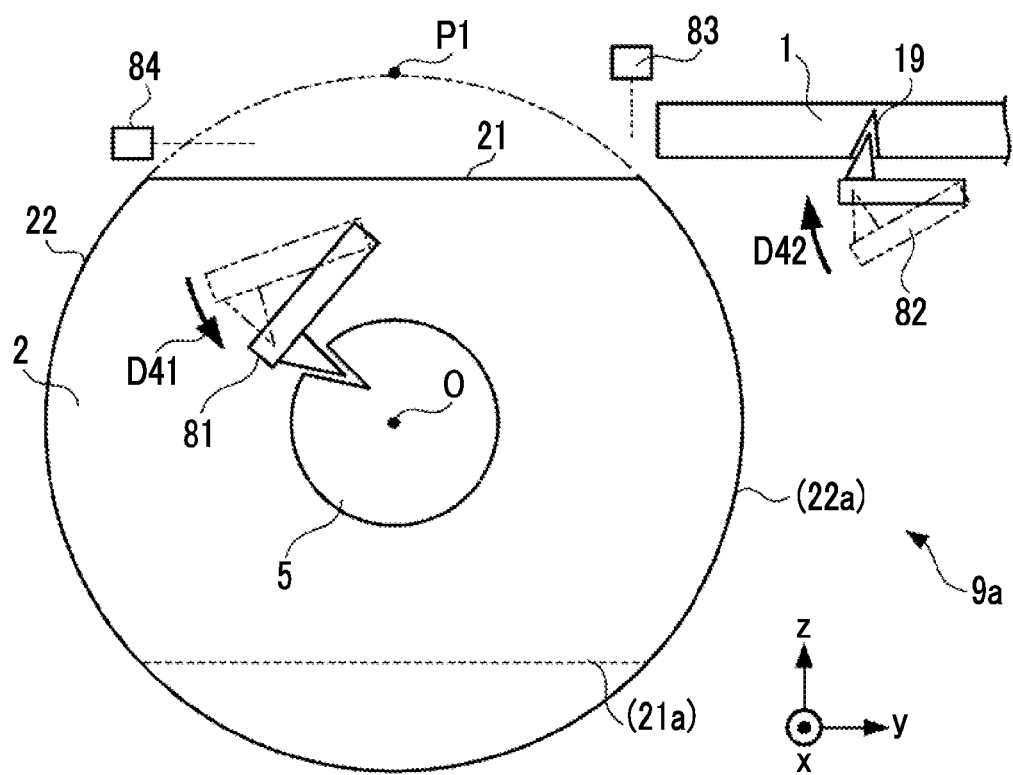
FIG. 4 is a view illustrating a regulating member according to an modification example.
Figure 5:
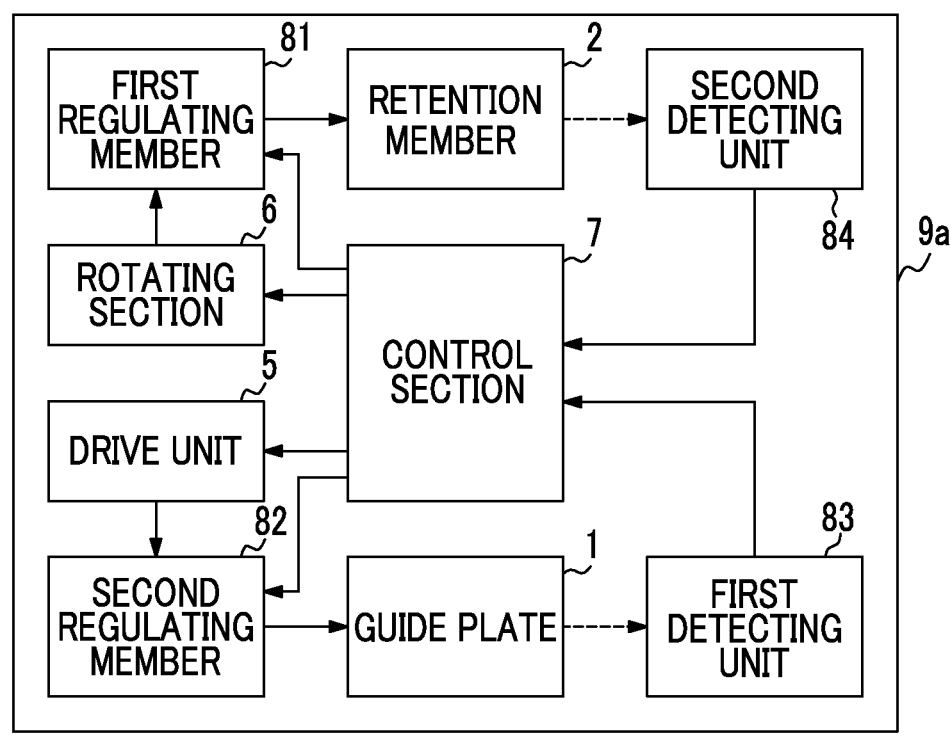
FIG. 5 is a block diagram illustrating a control system of the image reading apparatus according to a modification example.

In addition, in this case, the control section 7 does not cause the rotating section 6 to perform the forceful stop, but a regulating member that regulates the rotation of the retention member 2 physically may perform such a function. FIG. 4 is a view illustrating a regulating member according to the modification example. In addition, FIG. 5 is a block diagram illustrating a control system of an image reading apparatus 9*a* according to the modification example.

A first detecting unit 83 is a sensor that detects a position of the guide plate 1, for example, as an optical sensor. The first detecting unit 83 has an irradiation section that irradiates a determined position with an electromagnetic wave such as a visible light wave or an infrared wave. In addition, the first detecting unit 83 includes a detector such as a photodiode that performs irradiation from the irradiation section and receives an electromagnetic wave reflected from the surface of an object so as to output a signal in accordance with the strength of the electromagnetic wave thereof. Since the first detecting unit 83 irradiates, with the electromagnetic wave, the space in which the rotation of the retention member 2 brings about a collision with the guide plate 1, a signal output from the detector is changed depending on whether or not the guide plate 1 is present in the space.

A first regulating member 81 is a member having, for example, a wedge-like convex portion as illustrated in FIG. 4. When the convex portion is inserted into a concave portion provided on a rotation shaft 20 that causes the retention member 2 to rotate, the rotation of the rotation shaft 20 is forcibly stopped.

When the first detecting unit 83 detects that the guide plate 1 is present in the space where the rotation of the retention member 2 brings about a collision with the guide plate 1, the control section 7 causes the first regulating member 81 which is shown at a position shown by a two-dot chain line and is not in contact with the rotation shaft 20 to move in the direction of arrow D41. In this way, the convex portion of the first regulating member 81 is inserted into the concave portion of the rotation shaft 20 and the rotation of the rotation shaft 20 and the retention member 2 is stopped.

In this way, even when the control section 7 controls the rotating section 6 so as to cause the retention member 2 to rotate, the motion of the rotation of the retention member 2 is physically regulated if the first detecting unit 83 detects that there is a possibility that the guide plate 1 will collide with the retention member 2. Therefore, even in a case where the guide plate 1 remains in a space where a collision with the retention member 2 may occur due to an unintended operation, the collision is avoided.

2-5. Modification Example 5

When the retention member 2 is present in a space where the movement of the guide plate 1 toward the first position brings about a collision with the retention member 2, the drive unit 5 may be controlled by the control section 7 so as not to cause the movement of the guide plate 1. For example, the control section 7 detects the position of the retention member 2 using the optical sensor or the like and determines whether or not the retention member 2 is present in the space in which the movement of the guide plate 1 toward the first position brings about a collision with the retention member 2. In a case where it is determined that the retention member 2 is present in the space, the movement of the guide plate 1 toward the first position may be forcibly stopped by the drive unit 5. In this way, when at least a part of the retention member 2 remains at the first position due to some failure, for example, a collision with the retention member 2 due to the movement of the guide plate 1 is avoided.

Here, when it is determined whether or not the retention member 2 is present in the space in which the movement of the guide plate 1 toward the first position brings about a collision with the retention member 2, the rotation state (rotated angle) of the retention member 2 is stored in the control section 7 and the rotation of the retention member 2 by the rotating section 6 may be stopped in a case where it is determined that the second side surface 22 of the retention member 2 faces the reading section 3 or the first side surface 21 does not face the reading section 3.

In addition, the reading section 3 reads the color of the color sample and thereby it is determined that the retention member 2 is present in the space in which the movement of the guide plate 1 toward the first position brings about a collision with the retention member 2.

The first regulating member 81 may be a power transmission mechanism such that power of the rotating section 6 is transmitted to the retention member 2 when it is detected that there is no possibility of a collision of the guide plate 1 with the retention member 2, and power of the rotating section 6 is not transmitted to the retention member 2 when it is detected that there is a possibility of a collision of the guide plate 1 with the retention member 2. Specifically, the first regulating member 81 may be, for example, a clutch.

2-6. Modification Example 6

In addition, in this case, the control section 7 does not cause the drive unit 5 to be stopped forcibly, but a regulating member may function to regulate the movement of the guide plate 1 physically.

A second detecting unit 84 is a sensor that detects the position of the retention member 2, for example, and is an optical sensor. The second detecting unit 84 has an irradiation section and a detector described above. Since the second detecting unit 84 irradiates, with the electromagnetic wave, the space in which the movement of the guide plate 1 brings about a collision, a signal output from the detector is changed depending on whether or not the retention member 2 is present in the space.

A second regulating member 82 is a member having, for example, a wedge-like convex portion as illustrated in FIG. 4. When the convex portion is inserted into a concave portion 19 provided on a surface of the guide plate 1 in the −z direction the movement of the guide plate 1 is forcibly stopped.

When the second detecting unit 84 detects that the retention member 2 is present in the space where the movement of the guide plate 1 brings about a collision with the retention member 2, the control section 7 causes the second regulating member 82 which is at a position shown by a two-dot chain line and is not in contact with the guide plate 1 to move in the direction of arrow D42. In this way, the convex portion of the second regulating member 82 is inserted into the concave portion 19 of the guide plate 1 and the movement of the guide plate 1 is stopped.

In this way, even when the control section 7 controls the drive unit 5 so as to cause the guide plate 1 to move, the movement of the guide plate 1 is physically regulated if the second detecting unit 84 detects that there is a possibility that the retention member 2 will collide with the guide plate 1. Therefore, even in a case where the retention member 2 remains in a space where a collision with the guide plate 1 may occur due to an unintended operation, the collision is avoided.

The second regulating member 82 may be a power transmission mechanism such that power of the drive unit 5 is transmitted to the guide plate 1 when it is detected that there is no possibility of a collision of the retention member 2 with the guide plate 1, and power of the drive unit 5 is not transmitted to the guide plate 1 when it is detected that there is a possibility of a collision of the retention member 2 with the guide plate 1. Specifically, the second regulating member 82 may be, for example, a clutch.

2-7. Modification Example 7

The rotating section 6 may cause the retention member 2 to start rotating such that the color sample moves to the reading position P1 while the guide plate 1 moves from the first position to the second position. That is, even before the guide plate 1 reaches the second position, the rotating section 6 may cause the retention member 2 to rotate when the guide plate 1 is not present in a region where a collision occurs. In this way, compared to a case where the rotating section 6 causes the retention member 2 to start rotating after the guide plate 1 reaches the second position, the time taken for transition between states is shortened.

2-8. Modification Example 8

The rotating section 6 may cause the retention member 2 to start rotating such that the color sample is separated from the reading position P1 while the guide plate 1 moves from the second position to the first position. That is, even before the guide plate 1 reaches the first position, the rotating section 6 may cause the retention member 2 to rotate when the guide plate 1 is not present in a region where a collision occurs. In this way, compared to a case where the rotating section 6 causes the retention member 2 to start rotating after the guide plate 1 reaches the first position, the time taken for transition between states is shortened.

2-9. Modification Example 9

When the reading section 3 reads the color sample that moves to the reading position P1, the retention member 2 does not have to be stopped. The reading section 3 may read the plural color samples retained on the retention member 2 when the color samples are caused to rotate by the rotating section 6.

For example, in a case where one type of color sample is retained on the second side surface 22 over a length along a rotation direction of the retention member 2, the reading section 3 reads the color sample continuously during the rotation of the retention member 2. In this way, plural pixel values are obtained from one type of the color sample while the color sample having the length passes through the reading position P1. For example, the control section 7 computes an arithmetic average value of the plural obtained pixel values and may use the arithmetic average value for determination of a compensation expression. In this way, effects of color unevenness of the color sample itself, noise produced in the imaging unit 31, or the like are decreased and, thus, accuracy of the correction is improved. In addition, even in a case where unexpected dirt is attached to the color sample, the control section 7 computes dispersion values of the plural obtained pixel values. Then, the obtained dispersion value is compared to a determined threshold value and, thereby it is possible to detect a reading abnormality or to remove an abnormal pixel value.

2-10. Modification Example 10

The first side surface 21 and the second side surface 22 do not have to be one, respectively. For example, as illustrated in FIG. 4 by a dotted line, a configuration may be employed, in which a second first side surface 21a is provided at a position to which the first side surface 21 is rotated by 180 degrees with respect to a plane intersecting with the axis O being as an axis and second side surfaces 22 and 22a are provided on both sides thereof. When the same color sample is retained on both of the second side surfaces 22 and 22a, a rotation angle for a single operation of the calibration becomes 180 degrees.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
    a guide plate that is movable between a first position and a second position and is configured to guide a medium at a first side thereof when disposed at the first position;
    a retention member that is rotatable about an axis intersecting a direction in which the medium is guided, that has a first side surface and a second side surface which has a curvature greater than a curvature of the first side surface, and that retains a plurality of color samples on the second side surface;
    a reading unit configured to read, at a reading position, an image formed on the medium guided by the guide plate; and
    a rotating unit configured to cause the retention member to rotate such that a second side of the guide plate and the first side surface face each other when the guide plate is disposed at the first position and the plurality of color samples are moved to the reading position when the guide plate is disposed at the second position.

2. The image reading apparatus according to claim 1, wherein the image reading apparatus further comprises a transport member configured to transport the medium to the reading position, and
    wherein the transport member is configured to move to the second position with the guide plate when the color sample moves to the reading position.

3. The image reading apparatus according to claim 2, wherein the image reading apparatus is configured such that at least a part of the transport member faces the first side surface of the retention member when the guide plate is disposed at the first position.

4. The image reading apparatus according to claim 3, wherein the rotating unit is configured to refrain from causing the retention member to rotate when the guide plate is disposed in a space where rotation of the retention member would bring about a collision with the guide plate.

5. The image reading apparatus according to claim 4, further comprising:
a first regulating member configured to regulate the rotation of the retention member when the guide plate is disposed in a space where the rotation of the retention member would bring about a collision with the guide plate.

6. The image reading apparatus according to claim 3,
wherein the image reading apparatus is configured such that the guide plate is not caused to move when the retention member is disposed in a space where movement of the guide plate toward the first position would bring about a collision with the retention member.

7. The image reading apparatus according to claim 2,
wherein the image reading apparatus is configured such that the guide plate is not caused to move when the retention member is disposed in a space where movement of the guide plate toward the first position would bring about a collision with the retention member.

8. The image reading apparatus according to claim 1,
wherein the rotating unit is configured to refrain from causing the retention member to rotate when the guide plate is disposed in a space where rotation of the retention member would bring about a collision with the guide plate.

9. The image reading apparatus according to claim 2,
wherein the rotating unit is configured to refrain from causing the retention member to rotate when the guide plate is disposed in a space where rotation of the retention member would bring about a collision with the guide plate.

10. The image reading apparatus according to claim 9, further comprising:
a first regulating member configured to regulate the rotation of the retention member when the guide plate is disposed in a space where the rotation of the retention member would bring about a collision with the guide plate.

11. The image reading apparatus according to claim 8, further comprising:
a first regulating member configured to regulate the rotation of the retention member when the guide plate is disposed in a space where the rotation of the retention member would bring about a collision with the guide plate.

12. The image reading apparatus according to claim 11, wherein
the first regulating member has a convex portion,
the retention member has a concave portion, and
the convex portion of the first regulating member is configured to be inserted into the concave portion of the retention member when the guide plate is disposed in a space where the rotation of the retention member would bring about a collision with the guide plate.

13. The image reading apparatus according to claim 1,
wherein the image reading apparatus is configured such that the guide plate is not caused to move when the retention member is disposed in a space where movement of the guide plate toward the first position would bring about a collision with the retention member.

14. The image reading apparatus according to claim 13, further comprising:
a second regulating member configured to regulate movement of the guide plate when the retention member is disposed in a space where the movement of the guide plate toward the first position would bring about a collision with the retention member.

15. The image reading apparatus according to claim 14, wherein
the second regulating member has a convex portion,
the guide plate has a concave portion, and
the convex portion of the second regulating member is configured to be inserted into the concave portion of the guide plate when the retention member is disposed in a space where the movement of the guide plate toward the first position would bring about a collision with the retention member.

16. The image reading apparatus according to claim 1,
wherein the rotating unit is configured to cause the retention member to start rotating such that the plurality of color samples move to the reading position while the guide plate moves from the first position to the second position.

17. The image reading apparatus according to claim 1,
wherein the rotating unit is configured to cause the retention member to start rotating such that the plurality of color samples are separated from the reading position while the guide plate moves from the second position to the first position.

18. The image reading apparatus according to claim 1,
wherein the reading unit is configured to read the plurality of color samples retained on the retention member while the rotating unit causes the retention member to rotate.

19. The image reading apparatus according to claim 1,
wherein the first side surface is substantially flat.

20. The image reading apparatus according to claim 1,
wherein the second side surface has an arc shape.

* * * * *